US008936717B2

(12) United States Patent
Guillon et al.

(10) Patent No.: US 8,936,717 B2
(45) Date of Patent: *Jan. 20, 2015

(54) IZM-2 ZEOLITE-BASED CATALYST AND PROCESS FOR HYDROCONVERSION/HYDROCRACKING OF HYDROCARBONATED FEEDSTOCKS

(75) Inventors: Emmanuelle Guillon, Vourles (FR); Laurent Simon, Villeurbanne (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 657 days.

This patent is subject to a terminal disclaimer.

(21) Appl. No.: 13/057,781

(22) PCT Filed: Jul. 29, 2009

(86) PCT No.: PCT/FR2009/000942
§ 371 (c)(1), (2), (4) Date: Apr. 28, 2011

(87) PCT Pub. No.: WO2010/015736
PCT Pub. Date: Feb. 11, 2010

(65) Prior Publication Data
US 2011/0192765 A1    Aug. 11, 2011

(30) Foreign Application Priority Data
Aug. 8, 2008   (FR) .................................... 08 04562

(51) Int. Cl.
| | | |
|---|---|---|
| C10G 47/02 | (2006.01) | |
| B01J 29/072 | (2006.01) | |
| B01J 29/076 | (2006.01) | |
| B01J 29/76 | (2006.01) | |
| B01J 29/78 | (2006.01) | |
| B01J 37/00 | (2006.01) | |
| B01J 37/20 | (2006.01) | |
| C01B 39/48 | (2006.01) | |
| C10G 47/16 | (2006.01) | |
| C10G 47/20 | (2006.01) | |
| B01J 21/04 | (2006.01) | |
| B01J 21/12 | (2006.01) | |

(52) U.S. Cl.
CPC *B01J 29/76* (2013.01); *B01J 29/78* (2013.01); *B01J 37/0009* (2013.01); *B01J 37/20* (2013.01); *C01B 39/48* (2013.01); *C10G 47/16* (2013.01); *C10G 47/20* (2013.01); *B01J 21/04* (2013.01); *B01J 21/12* (2013.01); *B01J 2229/20* (2013.01); *B01J 2229/42* (2013.01); *C10G 2300/4018* (2013.01); *C10G 2300/107* (2013.01); *C10G 2300/1074* (2013.01); *C10G 2300/1077* (2013.01)
USPC ............... 208/110; 208/108; 502/60; 502/74; 502/77

(58) Field of Classification Search
CPC ........ C10G 47/02; C10G 47/00; C10G 47/16; C10G 47/20
USPC ................ 508/60; 208/107, 108, 110; 502/60
See application file for complete search history.

(56) References Cited

U.S. PATENT DOCUMENTS

| | | | |
|---|---|---|---|
| 4,539,193 A | 9/1985 | Valyocsik | |
| 5,207,893 A | 5/1993 | Iwamoto et al. | |
| 2003/0019788 A1* | 1/2003 | Benazzi et al. | 208/57 |
| 2003/0047486 A1* | 3/2003 | Cash et al. | 208/89 |
| 2006/0210472 A1 | 9/2006 | Hastoy et al. | |
| 2009/0192031 A1 | 7/2009 | Guillon et al. | |

FOREIGN PATENT DOCUMENTS

| | | | |
|---|---|---|---|
| EP | 1702888 A1 | 9/2006 | |
| EP | 1953118 A1 | 8/2008 | |
| WO | 2009004131 A1 | 1/2009 | |
| WO | 2009144411 A2 | 12/2009 | |
| WO | 2009144412 A2 | 12/2009 | |

OTHER PUBLICATIONS

World IP Organization. "International Search Report and Written Opinion." PCT/FR2009/000942, Applicant: IFP, Mailed: Jan. 22, 2010.

* cited by examiner

*Primary Examiner* — Prem C Singh
*Assistant Examiner* — Brandi M Doyle
(74) *Attorney, Agent, or Firm* — Millen, White, Zelano & Branigan, P.C.

(57) ABSTRACT

The present invention relates to a catalyst comprising at least one IZM-2 zeolite, at least one amorphous matrix, at least one hydro-dehydrogenating element selected from the group formed by the elements from group VIB and from group VIII of the periodic table and excluding platinum and palladium. The catalyst also optionally contains a controlled quantity of at least one doping element selected from phosphorus, boron and silicon, optionally at least one element from group VB of the periodic table of the elements, and optionally a group VIIA element. The invention also relates to hydrocracking and hydrotreatment processes implementing this catalyst.

14 Claims, No Drawings

IZM-2 ZEOLITE-BASED CATALYST AND PROCESS FOR HYDROCONVERSION/HYDROCRACKING OF HYDROCARBONATED FEEDSTOCKS

The present invention relates to a catalyst comprising a substrate comprising at least one crystallised IZM-2 solid and an active phase containing at least one hydro-dehydrogenating element from group VIB and/or from non-noble group VIII of the periodic table, said catalyst being a sulphide phase catalyst.

The invention also relates to hydrocracking, hydroconversion and hydrotreatment processes implementing this catalyst.

In particular, the invention relates to the hydrocracking of hydrocarbonated feedstocks containing, for example, aromatic and/or olefinic and/or naphthenic and/or paraffinic compounds, excluding feedstocks obtained by the Fischer-Tropsch process and optionally containing metals and/or nitrogen and/or oxygen and/or sulphur.

The objective of the hydrocracking process is basically the production of fuel, that is to say, petrol cuts having a boiling point of between 27 and 150° C., a kerosene cut having a boiling point of between 150 and 250° C., and a gas oil cut of between 250 and 380° C.

PRIOR ART

The hydrocracking of heavy petrol cuts is a very important refining process allowing the production, from excess heavy feedstocks which are unamenable to beneficiation, of lighter fractions such as light petrols, jet fuels and gas oils which the treater seeks in order to adapt its production to the structure of demand. Certain hydrocracking processes also provide a highly purified residue capable of providing excellent bases for oils. In relation to catalytic cracking, the benefit of catalytic hydrocracking is to provide middle distillates, jet fuels and gas oils of very good quality. Conversely, the petrol produced has a much lower octane number than that obtained from catalytic cracking.

Hydrocracking is a process which derives its flexibility from three main elements, which are the operating conditions used, the types of catalysts employed and the fact that hydrocarbonated feedstocks can be hydrocracked in one or two steps.

The hydrocracking catalysts used in the hydrocracking processes are all of the bifunctional type combining an acid function with a hydrogenating function. The acid function is provided by substrates, the surface areas of which vary generally from 150 to 800 $m^2 \cdot g^{-1}$ and displaying superficial acidity, such as halogenated (in particular chlorine-containing or fluorine-containing) aluminas, combinations of boron and aluminium oxides, amorphous silica-aluminas and zeolites. The hydrogenating function is provided either by one or more metals from group VIB of the periodic table of the elements or by a combination of at least one metal from group VIB of the periodic table and at least one group VIII metal.

The balance between the two functions, the acid function and the hydrogenating function, is one of the parameters governing the activity and the selectivity of the catalyst. A weak acid function and a strong hydrogenating function provide inactive catalysts, operating at generally elevated temperature (higher than or equal to 390-400° C.) and at a low feed space velocity (the HVV expressed in volume of feedstock to be treated per unit volume of catalyst and per hour is generally less than or equal to 2), but equipped with very good selectivity in relation to middle distillates. Conversely, a strong acid function and a weak hydrogenating function provide catalysts which are active but display less good selectivities in relation to middle distillates (jet fuels and gas oils).

One type of conventional hydrocracking catalysts is based on moderately acidic amorphous substrates, such as silica-aluminas for example. These systems are used for producing good-quality middle distillates and optionally oil bases. These catalysts are for example used in one-step processes. The drawback of these amorphous substrate-based catalysts is their low activity.

Catalysts comprising for example Y zeolite of structural type FAU, or catalysts comprising for example a beta-type zeolite, display, for their part, superior catalytic activity to that of silica-aluminas, but display lower selectivities in relation to middle distillates (jet fuels and gas oils).

The research studies conducted by the applicant on a large number of zeolites and crystallised microporous solids and on hydrogenating active phases led it to discover that, surprisingly, a catalyst for hydrocracking of hydrocarbonated feedstocks comprising a substrate comprising at least one crystallised IZM-2 solid and an active phase containing at least one hydro dehydrogenating element from group VIB and/or from non-noble group VIII of the periodic table, said catalyst being a sulphide phase catalyst, optionally at least one matrix, at least one doping element selected from the group formed by boron, silicon and phosphorus, optionally at least one element from group VB of the periodic table of the elements, and preferably niobium, and optionally a group VIIA element, and preferably fluorine, provides activities, that is to say a level of conversion, which are high in relation to hydrocracking, hydroconversion and hydrotreatment.

Characterisation Procedures

The overall composition of the catalyst can be determined by X-ray fluorescence on the catalyst in the pulverulent state or by atomic absorption after acidic attack of the catalyst.

It will be noted that the term "diameter" refers not uniquely to a ball or extrudate form, but more generally to any form of particles; in fact, the term "diameter" describes the representative length of the particle on which the measurement is carried out.

DETAILED DESCRIPTION OF THE INVENTION

The present invention relates to a catalyst comprising:
a substrate comprising at least one crystallised IZM-2 solid displaying an X-ray diffraction pattern including at least the rays listed in the table hereinafter:

| 2 theta (°) | dhkl (Å) | Irel |
|---|---|---|
| 5.07 | 17.43 | ww |
| 7.36 | 12.01 | ss |
| 7.67 | 11.52 | ss |
| 8.78 | 10.07 | s |
| 10.02 | 8.82 | ww |
| 12.13 | 7.29 | ww |
| 14.76 | 6.00 | ww |
| 15.31 | 5.78 | ww |
| 15.62 | 5.67 | ww |
| 16.03 | 5.52 | ww |
| 17.60 | 5.03 | ww |
| 18.22 | 4.87 | ww |
| 19.01 | 4.66 | ww |
| 19.52 | 4.54 | ww |
| 21.29 | 4.17 | m |
| 22.44 | 3.96 | w |
| 23.10 | 3.85 | mw |
| 23.57 | 3.77 | w |
| 24.65 | 3.61 | ww |

-continued

| 2 theta (°) | dhkl (Å) | Irel |
|---|---|---|
| 26.78 | 3.33 | w |
| 29.33 | 3.04 | ww |
| 33.06 | 2.71 | ww |
| 36.82 | 2.44 | ww |
| 44.54 | 2.03 | ww | where ss=very strong; s=strong; m=moderate; mw=moderately weak; w=weak; ww=very weak and having a chemical composition, expressed on an anhydrous base, in terms of oxide moles, by the following general formula: $XO_2:aY_2O_3:bM_{2/n}O$, wherein X represents at least one tetravalent element, Y represents at least one trivalent element and M is at least one alkali metal and/or an alkaline earth metal of valency n, a and b representing respectively the number of moles of $Y_2O_3$ and $M_{2/n}O$ and a is between 0 and 0.5 and b is between 0 and 1, and an active phase containing at least one hydro-dehydrogenating element from group VIB and/or at least one hydro-dehydrogenating element from non-noble group VIII of the periodic table, said catalyst being a sulphide phase catalyst.

The Hydrocracking and Hydroisomerisation Catalyst

According to the invention, said catalyst comprises an active phase containing at least one hydro-dehydrogenating element from group VIB and/or at least one hydro-dehydrogenating element from non-noble group VIII of the periodic table.

Preferably, the invention relates to a catalyst comprising at least one hydro-dehydrogenating element selected from the group formed by the elements from group VIB of the periodic table.

Preferably, said catalyst comprises, in % by weight relative to the total mass of the catalyst, a content by mass of group VIB metal(s) of between 0.1 and 40% by weight, very preferably between 1.5 and 35% by weight, and even more preferably between 3 and 25% by weight.

Preferably, the invention relates to a catalyst comprising at least one hydro-dehydrogenating element selected from the group formed by the elements from non-noble group VIII of the periodic table.

Preferably, said catalyst comprises, in % by weight relative to the total mass of the catalyst, a content by mass of non-noble group VIII metal(s) of between 0 and 25% by weight, preferably from 0.1 to 20% by weight and even more preferably from 0.1 to 15% by weight.

The catalyst can also advantageously contain
  from 0 to 20% by weight, preferably from 0.1 to 15% by weight and even more preferably from 0.1 to 10% by weight of at least one doping element selected from the group consisting of silicon, boron and phosphorus, not including silicon contained in the framework of the zeolite and optionally also
  from 0 to 60% by weight, preferably from 0.1 to 50% by weight, and even more preferably from 0.1 to 40% by weight, of at least one element selected from group VB and preferably niobium and optionally
  from 0 to 20% by weight, preferably from 0.1 to 15% by weight and even more preferably from 0.1 to 10% by weight of at least one element selected from group VIIA, preferably fluorine.

Preferably, the catalyst according to the invention comprises a substrate based on IZM-2 zeolite and an oxide-type porous inorganic matrix, said substrate, comprising:

0.1 to 99.8% by weight, preferably from 0.1 to 80% by weight, even more preferably from 0.1 to 70% by weight, and very preferably 0.1 to 50% by weight of IZM-2 zeolite,
  0.2 to 99.9% by weight, preferably from 1 to 99% by weight of at least one oxide-type porous inorganic matrix.

The invention also relates to a hydrocracking process and to a process for hydrotreatment of feedstocks hydrocarbonated with said catalyst.

Features of the Hydrogenating Phase

According to the invention, said catalyst comprises an active phase containing at least one hydro-dehydrogenating element from group VIB and/or at least one hydro-dehydrogenating element from non-noble group VIII of the periodic table.

Preferably, the invention relates to a catalyst comprising at least one hydro-dehydrogenating element selected from the group formed by the elements from group VIB of the periodic table and preferably a metal selected from the group formed by tungsten and molybdenum, taken alone or in a mixture.

According to a preferred embodiment, the hydro-dehydrogenating element selected from the group formed by the elements from group VIB of the periodic table is molybdenum.

According to another preferred embodiment, the hydro-dehydrogenating element selected from the group formed by the elements from group VIB of the periodic table is tungsten.

Preferably, the invention relates to a catalyst comprising at least one hydro-dehydrogenating element selected from the group formed by the non-noble elements from group VIII of the periodic table and preferably a metal selected from the group formed by cobalt and nickel, taken alone or in a mixture.

According to a preferred embodiment, the hydro-dehydrogenating element selected from the group formed by the non-noble group VIII, elements is cobalt.

According to a preferred embodiment, the hydro-dehydrogenating element selected from the group formed by the non-noble group VIII elements is nickel.

Advantageously, use is made of combinations of the following metals: nickel-molybdenum, cobalt-molybdenum, iron-molybdenum, iron-tungsten, nickel-tungsten, cobalt-tungsten; the preferred combinations are nickel-molybdenum, cobalt-molybdenum, cobalt-tungsten, nickel-tungsten and even more advantageously nickel-molybdenum and nickel-tungsten.

It is also possible to use combinations of three metals, for example nickel-cobalt-molybdenum, nickel-molybdenum-tungsten, nickel-cobalt-tungsten.

Advantageously, use is made of combinations of the following metals: nickel-niobium-molybdenum, cobalt-niobium-molybdenum, iron-niobium-molybdenum, nickel-niobium-tungsten, cobalt-niobium-tungsten, iron-niobium-tungsten, the preferred combinations being: nickel-niobium-molybdenum, cobalt-niobium-molybdenum. It is also possible to use combinations of four metals, for example nickel-cobalt-niobium-molybdenum.

The Crystallised IZM-2 Solid

According to the invention, the substrate of the catalyst according to the invention comprises at least one crystallised IZM-2 solid having a chemical composition expressed on an anhydrous base, in terms of oxide moles, by the following general formula: $XO_2:aY_2O_3:bM_{2/n}O$, wherein X represents at least one tetravalent element, Y represents at least one trivalent element and M is at least one alkali metal and/or an alkaline earth metal of valency n, a and b representing respectively the number of moles of $Y_2O_3$ and $M_{2/n}O$ and a is between 0 and 0.5 and b is between 0 and 1.

According to the invention, the crystallised IZM-2 solid used in the substrate of the catalyst displays an X-ray diffraction pattern including at least the rays listed in Table 1. This new crystallised IZM-2 solid has a new crystalline structure.

This diffraction pattern is advantageously obtained by X-ray crystallographic analysis by means of a diffractometer using the conventional method of powders with Kαl radiation of copper ($\lambda$=1.5406 Å). From the position, represented by the angle 2θ, of the diffraction peaks, the characteristic reticular equidistances $d_{hkl}$ of the sample are calculated by way of Bragg's law. The error of measurement $\Delta(d_{hkl})$ over $d_{hkl}$ is calculated owing to Bragg's law as a function of the absolute error $\Delta(2\theta)$ allocated to the measurement of 2θ. An absolute error $\Delta(2\theta)$ equal to ±0.02° is commonly accepted. The relative intensity $I_{rel}$ allocated to each value of $d_{hkl}$ is measured in accordance with the height of the corresponding diffraction peak. The X-ray diffraction pattern of the crystallised IZM-2 solid according to the invention comprises at least the rays at the values of $d_{hkl}$ given in Table 1. The column of the $d_{hkl}$ values shows the average values of the inter-reticular distances in Angstroms (Å). Each of these values must be modified by the error of measurement $\Delta(d_{hkl})$ of between ±0.6 Å and 0.01 Å.

TABLE 1

Average values of the $d_{hkl}$ values and relative intensities measured on an X-ray diffraction pattern of the calcined crystallised IZM-2 solid

| 2 theta (°) | dhkl (Å) | Irel |
|---|---|---|
| 5.07 | 17.43 | ww |
| 7.36 | 12.01 | ss |
| 7.67 | 11.52 | ss |
| 8.78 | 10.07 | s |
| 10.02 | 8.82 | ww |
| 12.13 | 7.29 | ww |
| 14.76 | 6.00 | ww |
| 15.31 | 5.78 | ww |
| 15.62 | 5.67 | ww |
| 16.03 | 5.52 | ww |
| 17.60 | 5.03 | ww |
| 18.22 | 4.87 | ww |
| 19.01 | 4.66 | ww |
| 19.52 | 4.54 | ww |
| 21.29 | 4.17 | m |
| 22.44 | 3.96 | w |
| 23.10 | 3.85 | mw |
| 23.57 | 3.77 | w |
| 24.65 | 3.61 | ww |
| 26.78 | 3.33 | w |
| 29.33 | 3.04 | ww |
| 33.06 | 2.71 | ww |
| 36.82 | 2.44 | ww |
| 44.54 | 2.03 | ww |

The relative intensity $I_{rel}$ is given in relation to a relative intensity scale in which it is allocated a value of 100 at the most intense ray of the X-ray diffraction pattern: ff<15; 15≤f<30; 30≤mw<50; 50≤m<65; 65≤s<85; ss≥85.

The crystallised IZM-2 solid used in the substrate of the catalyst according to the invention has advantageously a new crystalline basic or topological structure which is characterised by its X-ray diffraction pattern in the calcined form given by Figure 1.

Said IZM-2 solid has advantageously a chemical composition expressed on an anhydrous base, in terms of oxide moles, defined by the following general formula: $XO_2$: $aY_2O_3$:$bM_{2/n}O$, wherein X represents at least one tetravalent element, Y represents at least one trivalent element and M is at least one alkali metal and/or an alkaline earth metal of valency n. In said formula provided hereinbefore, a represents the number of moles of $Y_2O_3$ and a is between 0 and 0.5, very preferably between 0 and 0.05 and even more preferably between 0.0016 and 0.02 and b represents the number of moles of $M_{2/n}O$ and is between 0 and 1, preferably between 0 and 0.5 and even more preferably between 0.005 and 0.5.

Preferably, X is selected from silicon, germanium, titanium and the mixture of at least two of these tetravalent elements; very preferably, X is silicon and Y is preferably selected from aluminium, boron, iron, indium and gallium; very preferably, Y is aluminium. M is preferably selected from lithium, sodium, potassium, calcium, magnesium and the mixture of at least two of these metals and, very preferably, M is sodium. Preferably, X represents silicon, said crystallised IZM-2 solid is then an entirely silicic solid when the element Y is absent from the composition of said IZM-2 solid. It is also advantageous to employ as the element X a mixture of a plurality of elements X, in particular, a mixture of silicon with another element X selected from germanium and titanium, preferably germanium. Thus, when silicon is present mixed with another element X, said crystallised IZM-2 solid is then a crystallised metallosilicate displaying an X-ray diffraction pattern identical to that described in Table 1 when it is in its calcined form. Even more preferably and in the presence of an element Y, X being silicon and Y being aluminium: said crystallised IZM-2 solid is then a crystallised aluminosilicate displaying an X-ray diffraction pattern identical to that described in Table 1 when it is in its calcined form.

More generally, said IZM-2 solid used in the substrate of the catalyst implemented in the process according to the invention has advantageously a chemical composition expressed by the following general formula: $XO_2$:$aY_2O_3$: $bM_{2/n}O$:$cR$:$dH_2O$, wherein R represents an organic species comprising two quaternary nitrogen atoms, X represents at least one tetravalent element, Y represents at least one trivalent element and M is an alkali metal and/or an alkaline earth metal of valency n; a, b, c and d representing respectively the number of moles of $Y_2O_3$, $M_{2/n}O$, R and $H_2O$ and a is between 0 and 0.5, b is between 0 and 1, c is between 0 and 2 and d is between 0 and 2. This formula and the values assumed by a, b, c and d are those for which said IZM-2 solid is preferably in its calcined form.

More specifically, said IZM-2 solid, in its crude synthesis form, has advantageously a chemical composition expressed by the following general formula: $XO_2$:$aY_2O_3$:$bM_{2/n}O$:$cR$: $dH_2O$ (I), wherein R represents an organic species comprising two quaternary nitrogen atoms, X represents at least one tetravalent element, Y represents at least one trivalent element and M is an alkali metal and/or an alkaline earth metal of valency n; a, b, c and d representing respectively the number of moles of $Y_2O_3$, $M_{2/n}O$, R and $H_2O$ and a is between 0 and 0.5, b is between 0 and 1, c is between 0.005 and 2 and preferably between 0.01 and 0.5, and d is between 0.005 and 2 and preferably between 0.01 and 1.

In Formula (I) provided hereinbefore to define the chemical composition of said crystallised IZM-2 solid in its crude synthesis form, the value of a is between 0 and 0.5, very preferably between 0 and 0.05 and even more preferably between 0.0016 and 0.02. Preferably, b is between 0 and 1; very preferably, b is between 0 and 0.5 and, even more preferably, b is between 0.005 and 0.5. The value of c is between 0.005 and 2, advantageously between 0.01 and 0.5. The value assumed by d is between 0.005 and 2, preferably between 0.01 and 1.

In its crude synthesis form, i.e. directly obtained from the synthesis and prior to any calcining step well known to a person skilled in the art, said IZM-2 solid comprises advantageously at least the organic species R having two quaternary nitrogen atoms such as that described hereinafter or else its decomposition products or else its precursors. According to a preferred mode of the invention, in Formula (I) provided hereinbefore, the element R is 1,6-bis(methylpiperidinium) hexane, the structural formula of which is provided hereinafter. Said organic species R, which acts as a structuring agent, can be eliminated via the conventional routes known in the art, such as heat and/or chemical treatments.

A process for preparing said crystallised IZM-2 solid consists advantageously in reacting an aqueous mixture comprising at least one source of at least one $XO_2$ oxide, optionally at least one source of at least one $Y_2O_3$ oxide, optionally at least one source of at least one alkali metal and/or alkaline earth metal of valency n, at least one organic species R comprising two quaternary nitrogen atoms, the mixture having preferably the following molar composition:

$XO_2/Y_2O_3$: at least 2, preferably at least 20, more preferably from 60 to 600,
$H_2O/XO_2$: 1 to 100, preferably from 10 to 70,
$R/XO_2$: 0.02 to 2, preferably from 0.05 to 0.5,
$M_{2/n}O/XO_2$: 0 to 1, preferably from 0.005 and 0.5,
where X is one or more tetravalent element(s) selected from the group formed by the following elements: silicon, germanium, titanium, preferably silicon, where Y is one or more trivalent element(s) selected from the group formed by the following elements: aluminium, iron, boron, indium and gallium, preferably aluminium and where M is one or more alkali metal(s) and/or alkaline earth metal(s) selected from lithium, sodium, potassium, calcium, magnesium and the mixture of at least two of these metals, preferably sodium.

According to the process for preparing said crystallised IZM-2 solid, R is advantageously an organic species having two quaternary nitrogen atoms acting as an organic structuring agent. Preferably, R is the nitrogen-containing compound 1,6-bis(methylpiperidinium)hexane. The anions associated with the quaternary ammonium cations present in the structuring organic species for the synthesis of said crystallised IZM-2 solid are advantageously selected from the acetate anion, the sulphate anion, the carboxylate anion, the tetrafluoroborate anion, the halide anions such as fluoride, chloride, bromide, iodide, the hydroxide anion and a combination of a plurality thereof. Preferably, the anions associated with the quaternary ammonium cations present in the structuring species for the synthesis of the crystallised IZM-2 solid are selected from the hydroxide anion and the bromide anion. Said nitrogen-containing organic species used as the structuring agent of said crystallised IZM-2 solid is advantageously synthesised by any method known to a person skilled in the art. For the synthesis of 1,6-bis(methylpiperidinium) hexane dibromide, one mole of 1,6-dibromohexane and at least 2 moles of N-methylpiperidine are advantageously mixed in ethanol. Generally, the mixture is refluxed over a period of between 3 and 10 hours. After filtration, precipitation by means of an ethereal solvent such as diethyl ether, then recrystallisation in an ethanol/ether mixture, 1,6-bis(methylpiperidinium)hexane dibromide is obtained. 1,6-bis(methylpiperidinium)hexane dihydroxide is preferably obtained by treatment at ambient temperature of an aqueous solution of 1,6-bis(methylpiperidinium)hexane dibromide by silver oxide $Ag_2O$.

The source of the element X, employed for carrying out the process for preparing said crystallised IZM-2 solid, may advantageously be any compound which comprises the element X and can release this element in aqueous solution in a reactive form. Advantageously, when the element X is silicon, the silica source may be any one of those commonly used in the synthesis of zeolites, for example powdered solid silica, silicic acid, colloidal silica, dissolved silica or tetraethoxysilane (TEOS). Of the powdered silicas, use may advantageously be made of precipitated silicas, in particular those obtained by precipitation from an alkali metal silicate solution, such as aerosil silicas, pyrogenic silicas, for example "CAB-O-SIL" and silica gels. Use may be made of colloidal silicas having various particle sizes, for example having an average equivalent, diameter of between 10 and 15 nm or between 40 and 50 nm such as those sold under the registered trade marks such as "LUDOX". Preferably, the silicon source is LUDOX AS-40.

The source of the element Y, optionally employed for carrying out the process for preparing said crystallised IZM-2 solid, may advantageously be any compound which comprises the element Y and can release this element in aqueous solution in a reactive form. In the preferred case where Y is aluminium, the alumina source is preferably sodium aluminate, or an aluminium salt, for example chloride, nitrate, hydroxide or sulphate, an aluminium alkoxide or alumina proper, preferably in hydrated or hydratable form, such as for example colloidal alumina, pseudoboehmite, gamma alumina or alpha or beta trihydrate. Mixtures of the sources cited hereinbefore can also be used.

For the source of alkali metal M and/or alkaline earth metal of valency n, use is advantageously made of a halide or a hydroxide of said metal M, preferably a hydroxide of said metal M.

For carrying out the process for preparing said IZM-2 solid, it is preferred for the aqueous mixture, comprising at least one source of at least one $XO_2$ oxide, optionally at least one source of at least one $Y_2O_3$ oxide, optionally at least one source of at least one alkali and/or alkaline earth metal of valency n, at least one organic species R having two quaternary nitrogen atoms, to comprise also at least one source of hydroxide ions. Said source of hydroxide ions originates advantageously from the structuring organic species R when it is in its hydroxide form, namely 1,6-bis(methylpiperidinium)hexane dihydroxide, or else from the source of alkali and/or alkaline earth metal M when it is in hydroxide form, for example sodium hydroxide.

Therefore, according to a preferred embodiment of the process for preparing said crystallised IZM-2 solid, an aqueous mixture comprising a silicon oxide, optionally alumina, 1,6-bis(methylpiperidinium)hexane dibromide and sodium hydroxide is reacted. According to another preferred embodiment of the process according to the invention, an aqueous mixture comprising a silicon oxide, optionally alumina and 1,6-bis(methylpiperidinium)hexane dihydroxide, is reacted.

The process for preparing said crystallised IZM-2 solid consists advantageously in preparing an aqueous reaction mixture called a gel and containing at least one source of at least one $XO_2$ oxide, optionally at least one source of at least one $Y_2O_3$ oxide, at least one organic species R, optionally at least one source of at least one alkali and/or alkaline earth metal of valency n. The quantities of said reagents are advantageously adjusted in such a way as to impart to this gel a composition allowing crystallisation thereof in a crystallised IZM-2 solid in its crude synthesis form of general formula (I) $XO_2:aY_2O_3:bM_{2/n}O:cR:dH_2O$, where a, b, c and d meet the criteria defined hereinbefore when c and d are greater than 0. Then, the gel is subjected to a hydrothermal treatment until said crystallised IZM-2 solid is formed. The gel is advantageously placed under hydrothermal conditions under an autogenous reaction pressure, optionally while adding gas, for example nitrogen, at a temperature of between 120° C. and 200° C., preferably between 140° C. and 180° C., and even more preferably between 160 and 175° C. until the solid IZM-2 crystals are formed in its crude synthesis form. The period of time necessary to obtain crystallisation varies generally between 1 hour and several months as a function of the composition of the reagents in the gel, the stirring and the reaction temperature. Preferably, the crystallisation period varies between 2 hours and 21 days. The reacting is carried out generally while stirring or in the absence of stirring, preferably in the presence of stirring.

It may be advantageous to add seeds to the reaction mixture in order to reduce the time required to form the crystals and/or the total crystallisation period. It may also be advantageous to use seeds in order to promote the formation of said crystallised IZM-2 solid to the detriment of impurities. Seeds of this type comprise advantageously crystallised solids, in particular crystals of IZM-2 solid. The crystalline seeds are generally added in a proportion of between 0.01 and 10% of the mass of the $XO_2$ oxide used in the reaction mixture.

At the end of the hydrothermal treatment step leading to the crystallisation of said IZM-2 solid, the solid phase is advantageously filtered, washed, dried and then calcined. The calcining step is performed advantageously by way of one or more heating steps carried out at a temperature of between 100 and 1,000° C., preferably between 400 and 650° C., for a period of between a few hours and several days, preferably between 3 hours and 48 hours. Preferably, the calcining is carried out in two consecutive heating steps.

At the end of said calcining step, said IZM-2 solid obtained is advantageously that displaying the X-ray diffraction pattern including at least the rays listed in Table 1. It contains neither water nor the organic species R which are present in the IZM-2 solid in its crude synthesis form.

After calcining, the IZM-2 solid entering the composition of the substrate of the catalyst according to the invention is advantageously exchanged by at least one treatment with a solution of at least one ammonium salt in such a way as to obtain the ammonium form of the IZM-2 solid which, once calcined, leads to the ($H^+$) acid form of said IZM-2 solid. This exchange step can be carried out at any stage of the preparation of the catalyst, i.e. after the step of preparing the IZM-2 solid, after the step of shaping the IZM-2 solid (by pelletising or by way of a porous inorganic binder), or else after the step of introducing the hydro-dehydrogenating metal. Preferably, the exchange step is carried out after the step of shaping the IZM-2 solid.

Said IZM-2 solid entering the composition of the substrate of the catalyst used in the process according to the invention is advantageously at least partially, preferably almost totally, in acid form, i.e. in ($H^+$) acid form. The MN atomic ratio is generally advantageously less than 0.1 and preferably less than 0.05 and even more preferably less than 0.01.

The IZM-2 zeolite implemented in accordance with the invention is at least partially in hydrogen ($H^+$) or ammonium ($NH_4^+$) form. Optionally, a portion of the zeolite may be in cationic form, said cation being selected from the group formed by groups IA, IB, IIA, IIB, IIIA, IIIB (including the rare earths), Sn, Pb and Si. The IZM-2 zeolite, in hydrogen form or partially in hydrogen form, designated by H-IZM-2 is obtained by calcining and/or ionic exchanges of the synthesis crude IZM-2 zeolite.

Of the IZM-2 zeolites, it is usually preferable to employ IZM-2 zeolites, the overall silicon/aluminium (Si/Al) atomic ratio of which is greater than about 3, and even more preferably IZM-2 zeolite, the Si/Al ratio of which is between 5 and 200 and even more preferably between 10 and 150. These IZM-2 zeolites, having the Si/Al ratios described hereinbefore, can be obtained on synthesis or by any post-synthesis procedure known to a person skilled in the art, i.e. for example dealuminisation, realuminisation, desilication or exchange procedures. The preparation and the treatment or treatments as well as the shaping of the zeolite can thus constitute a step for the preparation of these catalysts.

Features of the Oxide-Type Amorphous or Poorly Crystallised Porous Inorganic Matrix The porous, usually amorphous, inorganic matrix generally, consists of at least one refractory oxide. Said matrix is usually selected from the group formed by alumina, silica, clays, titanium oxide, boron oxide and zirconia. The matrix may consist of a mixture of at least, two of the oxides cited hereinbefore, for example silica-alumina. It is also possible to select aluminates. Use is preferably made of matrices containing alumina, in all its forms known to a person skilled in the art, for example gamma alumina.

Use may, also advantageously be made of mixtures of alumina and silica, of mixtures of alumina and silica-alumina.

The invention also relates to a hydrocracking process and to a process for the hydrotreatment of feedstocks hydrocarbonated with said catalyst.

Preparation of the Catalyst

A preferred process for preparing the catalyst according to the present invention includes the following steps:

The IZM-2 zeolite implemented in accordance with the invention can be introduced using any method known to a person skilled in the art, at any stage of the preparation of the substrate or the catalyst. The IZM-2 zeolite implemented in accordance with the invention is at least partially in hydrogen ($H^+$) or ammonium ($NH_4^+$) form as described hereinbefore.

The zeolite may be, without thereby entailing any limitation, for example in the form of a powder, ground powder, suspension, suspension having undergone a deagglomeration treatment. Thus, for example, the zeolite can be placed in an acidulated or non-acidulated suspension at a concentration adjusted to the final zeolite content aimed at on the substrate. This suspension, which is commonly called a slip, is then mixed with the precursors of the matrix.

According to a preferred embodiment, the zeolite can be introduced during the shaping of the substrate with the elements which constitute the matrix. For example, according to this preferred mode of the present invention, the IZM-2 zeolite is added to a moist alumina gel over the course of the step for shaping the substrate.

One of the preferred methods for the shaping of the substrate in the present invention consists in kneading at least one IZM-2 zeolite with a moist alumina gel for a few tens of minutes, then in passing the paste thus obtained through a die in order to form extrudates having a diameter of between 0.4 and 4 mm.

According to another preferred mode of preparation, the zeolite can be introduced over the course of the synthesis of the matrix. For example, according to this preferred mode of the present invention, the IZM-2 zeolite is added over the course of the synthesis of the aluminium-silicon matrix; the zeolite can be added to a mixture composed of an alumina compound in an acidic medium with a totally soluble silica compound.

The substrate can be shaped by any procedure known to a person skilled in the art. The shaping can advantageously be earned out for example by extrusion, by pelletising, by the ("oil-drop") drop coagulation method, by granulation on a turntable or by any other method well known to a person skilled in the art.

At least one calcination can advantageously be carried out after any one of the steps of the preparation. The calcining treatment is usually carried out under air at a temperature of at least 150° C., preferably at least 300° C., more preferably between about 350 and 1,000° C.

The group VIB elements, and optionally the group VIII elements excluding platinum and palladium, and optionally those selected from phosphorus, boron, silicon and optionally the group VB and VIIB elements can be optionally introduced, in their entirety or in part, at any stage of the preparation, over the course of the synthesis of the matrix, preferably during the shaping of the substrate, or very preferably after the shaping of the substrate by any method known to a person skilled in the art. They can be introduced after the shaping of the substrate, after or before the drying and the calcining of the substrate.

According to a preferred mode of the present invention, all or some of the group VIB elements, and optionally the group VIII elements excluding platinum and palladium, and optionally those selected from phosphorus, boron, silicon and optionally the group VB and VIIB elements can be introduced over the course of the shaping of the substrate, for example, during the step of kneading the IZM-2 zeolite with a moist alumina gel.

According to another preferred mode of the present invention, all or some of the group VIB elements, and optionally the group VIII elements excluding platinum and palladium, and optionally those selected from phosphorus, boron, silicon and optionally the group VB and VIIB elements can be introduced by way of one or more operations for impregnating the shaped and calcined substrate, by way of a solution containing the precursors of these elements. Preferably, the substrate is impregnated by an aqueous solution. The substrate is preferably impregnated by what is known as the "dry" impregnating method well known to a person skilled in the art.

If the catalyst of the present invention contains a group VIII metal excluding platinum and palladium, the group VIII metals are preferably introduced by way of one or more operations for impregnating the shaped and calcined substrate, after those from group VIB or at the same time as the latter.

According to another preferred mode of the present invention, boron and silicon can also be deposited simultaneously while using, for example, a solution containing a boron salt and a silicone-type silicon compound.

The impregnating of niobium can be facilitated by adding oxalic acid and optionally ammonium oxalate to the niobium oxalate solutions. Other compounds can be used to improve the solubility and to facilitate the impregnating of niobium, as is well known to a person skilled in the art.

When at least one doping element, P and/or B and/or Si, is introduced, distribution thereof and locating thereof can be determined by procedures such as Castaing microprobing (distribution profile of the various elements), transmission electron microscopy linked to an X-analysis of the components of the catalyst, or else by establishing distribution mapping of the elements present in the catalyst by way of an electron microprobe.

It is interesting to prepare catalysts displaying homogeneous $C_{Mo}$, $C_{Ni}$, $C_W$ and $C_P$ concentrations along the extrudate. It is also interesting to prepare catalysts displaying different core and peripheral $C_{Mo}$, $C_{Ni}$, $C_W$ and $C_P$ concentrations. These catalysts display what are known as "dished" or "domed" distribution profiles. Another type of distribution is dust distribution where the active phase elements are distributed at the surface. Generally speaking, the core/edge ratio of the $C_{Mo}$, $C_{Ni}$, $C_W$ and $C_P$ concentrations is between 0.1 and 3. In a variant of the invention, it is between 0.8 and 1.2. In another variant of the invention, the core/edge ratio of the $C_P$ concentrations is between 0.3 and 0.8.

For example, of the molybdenum and tungsten sources, use may be made of oxide and hydroxides, molybdic and tungstic acids and salts thereof, in particular ammonium salts such as ammonium molybdate, ammonium heptamolybdate, ammonium tungstate, phosphomolybdic acid, phosphotungstic acid and salts thereof, silicomolybdic acid, silicotungstic acid and salts thereof. Use is preferably made of oxides and ammonium salts such as ammonium molybdate, ammonium heptamolybdate and ammonium tungstate.

The sources of group VIII non-noble elements that can be used are well known to a person skilled in the art. For example, for non-noble metals, use will be made of nitrates, sulphates, hydroxides, phosphates, halides such as, for example, chlorides, bromides and fluorides, carboxylates such as, for example, acetates and carbonates.

The preferred phosphorus source is orthophosphoric acid $H_3PO_4$, although its salts and esters, such as ammonium phosphates, are also suitable. The phosphorus can for example be introduced in the form of a mixture of phosphoric acid and a basic organic compound containing nitrogen such as ammonia, primary and secondary amines, cyclic amines, compounds of the pyridine family and quinolines and compounds of the pyrrole family. Tungstophosphoric or tungstomolybdic acids can be employed.

The phosphorus content is adjusted, without thereby limiting the scope of the invention, in such a way as to form a mixed compound which is dissolved and/or on the substrate, for example tungsten-phosphorus or molybdenum-tungsten-phosphorus. These mixed compounds may be heteropolyanions. These compounds may be Anderson heteropolyanions, for example. The content by mass of phosphorus, calculated in the form $P_2O_5$, is between 0.01 and 5% by weight, preferably between 0.1 and 4% by weight, and more preferably between 0.2 and 2% by weight and even more preferably between 0.2 and 1% by weight.

The boron source may be boric acid, preferably orthoboric acid $H_3BO_3$, ammonium biborate or pentaborate, boron oxide, boric esters. The boron can for example be introduced in the form of a mixture of boric acid, hydrogen peroxide and a basic organic compound containing nitrogen such as ammonia, primary and secondary amines, cyclic amines, compounds of the pyridine family and quinolines and compounds of the pyrrole family. The boron can be introduced for example by way of a boric acid solution in a water/alcohol mixture.

A large number of silicon sources can be employed. Thus, ethyl orthosilicate $Si(OEt)_4$, siloxanes, polysiloxanes, silicones, silicone emulsions, halide silicates such as ammonium fluorosilicate $(NH_4)_2SiF_6$ or sodium fluorosilicate $Na_2SiF_6$ can be used Silicomolybdic acid and its salts, silicotungstic acid and its salts can also be advantageously employed. The silicon can be added, for example, by impregnation of ethyl silicate dissolved in a water/alcohol mixture. The solution can be added, for example, by impregnating a silicone or silicic acid-type silicon compound suspended in water.

The sources of the group VB element that can be used are well known to a person skilled in the art. For example, of the niobium sources, use may be made of oxides, such as diniobium pentoxide $Nb_2O_5$, niobic acid $Nb_2O_5.H_2O$, niobium hydroxides and polyoxoniobates, niobium alkoxides of formula $Nb(OR1)_3$, where R1 is an alkyl radical, niobium oxalate $NbO(HC_2O_4)_5$, ammonium niobate. Niobium oxalate or an niobate is preferably used.

The sources of group VIIA elements that can be used are well known to a person skilled in the art. For example, fluoride and ions can be introduced in the form of fluorohydric acid or salts thereof. These salts are formed with alkali metals, ammonium or an organic compound. In the latter case, the salt is advantageously formed in the reaction mixture by reaction between the organic compound and fluorohydric acid. It is also possible to use hydrolysable compounds which can release fluoride anions in water, such as ammonium fluorosilicate $(NH_4)_2 SiF_6$, silicon tetrafluoride $SiF_4$ or sodium tetrafluoride $Na_2SiF_6$. Fluorine can be introduced, for example, by impregnating an aqueous fluorohydric acid or ammonium fluoride solution.

The catalysts used in accordance with the invention are in the form of spheres or extrudates. It is however advantageous for the catalyst to be in the form of extrudates having a diameter of between 0.5 and 5 mm and more specifically between 0.7 and 2.5 mm. The shapes are cylindrical (which may be hollow or non-hollow), twisted cylindrical, multilobed (2, 3, 4 or 5 lobes for example), annular. The cylindrical shape is preferably used, although any other shape can be used. The catalysts according to the invention can optionally be manufactured and employed in the form of crushed powders, tablets, rings, balls, wheels.

According to the invention, the group VIB and/or group VIII metals of the catalyst of the present invention are present in sulphided form, the sulphiding treatment being described hereinafter.

The invention also relates to a process for hydrocracking feedstocks hydrocarbonated with said catalysts.

Hydrocracking Processes

The invention also relates to processes for the treatment of hydrocarbonated cuts using the catalysts according to the invention.

More specifically, the invention relates to a hydrocracking and/or hydroconversion process as well as to a process for the hydrotreatment of hydrocarbonated feedstocks using the catalyst according to the invention.

The hydrocracking and/or hydroconversion process and the hydrotreatment process according to the invention operate in the presence of hydrogen, at a temperature higher than 200° C., under a pressure higher than 1 MPa, the space velocity being between 0.1 and 20 h$^{-1}$ and the quantity of hydrogen introduced is such that the liter of hydrogen/liter of hydrocarbon ratio by volume is between 80 and 5,000 l/l.

The catalysts according to the invention are used advantageously for the hydrocracking and/or the hydroconversion of hydrocarbonated cuts.

The catalysts according to the invention can be used for the hydrotreatment of hydrocarbonated feedstocks; said hydrotreatment process can be placed alone or upstream of a hydrocracking and/or hydroconversion process on a zeolite or alumina-silica-based hydrocracking catalyst, comprising preferably nickel and tungsten.

Sulphiding the Catalysts

According to the invention and prior to the injection of the feedstock, the catalysts used in the process according to the present invention are subjected beforehand to a sulphiding treatment allowing the metallic species to be transformed, at least in part, into sulphide before contacting thereof with the feedstock to be treated. This treatment of activation by sulphiding is well known to a person skilled in the art and can be carried out using any method which has already been described in the literature, either in situ, i.e. in the reactor, or ex situ.

A conventional sulphiding method well known to a person skilled in the art consists in heating the catalyst in the presence of hydrogen sulphide (pure or for example under the stream of a hydrogen/hydrogen sulphide mixture) at a temperature of between 150 and 800° C., preferably between 250 and 600° C., generally in a reaction zone with a passed-through bed.

Feedstocks

A very broad range of feedstocks can be treated using the processes according to the invention described hereinbefore. Generally, they contain at least 20% by volume and often at least 80% by volume of compounds boiling above 340° C.

The feedstock may be, for example, LCOs (light cycle oils (light gas oils obtained from a catalytic cracking unit)), atmospheric distillates, distillates under vacuum, for example gas oils obtained by direct distillation of the crude substance or of conversion units such as FCCs, coker or viscosity breaking, as well as feedstocks originating from aromatic extraction units of lubricating oil bases or obtained by solvent dewaxing of lubricating oil bases, or else distillates originating from processes for desulphurisation or hydroconversion in a fixed bed or in a bed ebullating with ARs (atmospheric residues) and/or RUVs (residues under vacuum) and/or deasphalted oils, or else the feedstock may be a deasphalted oil, or else any mixture of the feedstocks cited hereinbefore. The foregoing list does not entail any limitation. Paraffins obtained by the Fischer-Tropsch process are excluded. In general, the feedstocks have a boiling point T5 of higher than 340° C., and better still higher than 370° C., that is to say, 95% of the compounds present in the feedstock have a boiling point of higher than 340° C., and better still higher than 370° C.

The nitrogen content of the feedstocks treated in the processes according to the invention is usually greater than 500 ppm by weight, preferably between 500 and 10,000 ppm by weight, more preferably between 700 and 4,000 ppm by weight and even more preferably between 1,000 and 4,000 ppm by weight. The sulphur content of the feedstocks treated in the processes according to the invention is usually between 0.01 and 5% by weight, preferably between 0.2 and 4% by weight and even more preferably between 0.5 and 3% by weight.

The feedstock can optionally contain metals. The cumulative nickel and vanadium content of the feedstocks treated in the processes according to the invention is preferably lower than 1 ppm by weight.

The asphaltene content is generally lower than 3,000 ppm by weight, preferably lower than 1,000 ppm by weight, even more preferably lower than 200 ppm by weight.

Guard Beds

If the feedstock contains resin and/or asphaltene-type compounds, it is advantageous to pass beforehand the feedstock over a catalyst or adsorbent bed which is different from the hydrocracking and/or hydroconversion and/or hydrotreatment catalyst. The catalysts or guard beds used in accordance with the invention are in the form of spheres or extrudates. It is however advantageous for the catalyst to be in the form of extrudates having a diameter of between 0.5 and 5 mm and more specifically between 0.7 and 2.5 mm. The shapes are cylindrical (which may be hollow or non-hollow), twisted cylindrical, multilobed (2, 3, 4 or 5 lobes for example), annular. The cylindrical shape is preferably used, although any other shape can be used.

In order to make good the presence of contaminants and/or poisons in the feedstock, the guard catalysts can, in another preferred embodiment, have more specific geometric shapes in order to increase the void fraction thereof. The void fraction of these catalysts is between 0.2 and 0.75. Their external diameter can vary between 1 and 35 mm. Examples of possible particular shapes include (without this list entailing any limitation): hollow cylinders, hollow rings, Raschig rings, serrated hollow cylinders, crenellated hollow cylinders, penta-ring cartwheels, multiple-holed cylinders, etc.

These catalysts or guard beds may have been impregnated by an active or non-active phase. Preferably, the catalysts are impregnated by a hydro-dehydrogenating phase. Very preferably, the CoMo or NiMo phase is used.

These catalysts or guard beds can display macroporosity. The guard beds may be those sold by Norton-Saint-Gobain, for example MacroTrap® guard beds. The guard beds may be those sold by Axens in the ACT family: ACT077, ACT935, ACT961 or HMC841, HMC845, HMC941 or HMC945. It may be particularly advantageous to superimpose these catalysts in at least two different beds of variable heights. The catalysts having the highest void fraction are preferably used in the first catalytic bed or beds at the inlet of the catalytic reactor. It may also be advantageous to use at least two different reactors for these catalysts.

The preferred guard beds according to the invention are the HMCs and the ACT961.

Operating Conditions

The operating conditions, such as the temperature, pressure, hydrogen recycling rate, hourly volume velocity, may be variable as a function of the nature of the feedstock, of the quality of the desired products and of the installations which the treater possesses. The hydrocracking/hydroconversion or hydrotreatment catalyst is generally contacted, in the presence of hydrogen, with the feedstocks described hereinbefore, at a temperature of higher than 200° C., often between 250 and 480° C., advantageously between 320 and 450° C., preferably between 330 and 435° C., under a pressure higher than 1 MPa, often between 2 and 25 MPa, preferably between 3 and 20 MPa, the space velocity being between 0.1 and 20 $h^{-1}$ and preferably 0.1 and 6 $h^{-1}$, preferably 0.2 and 3 $h^{-1}$, and the quantity of hydrogen introduced is such that the liter of hydrogen/liter of hydrocarbon ratio by volume is between 80 and 5,000 l/l and most often between 100 and 2,000 l/l.

These operating conditions used in the processes according to the invention generally allow rates of conversion per pass, into products having boiling points of lower than 340° C. and, better, of lower than 370° C., of greater than 15% by weight and even more preferably of between 20 and 95% by weight to be attained.

Embodiments

Hydrocracking and/or hydroconversion processes implementing the catalysts according to the invention cover pressure and conversion fields ranging from soft hydrocracking to high-pressure hydrocracking. The term "soft hydrocracking" refers to hydrocracking leading to moderate conversion rates, generally of less than 40%, and functioning at low pressure, generally between 2 MPa and 6 MPa.

The catalyst of the present invention can be used alone, in a single or a plurality of fixed-bed catalytic beds, in one or more reactors, in what is known as a one-step hydrocracking scheme, with or without liquid recycling of the non-converted fraction, optionally combined with a hydrorefining catalyst situated upstream of the catalyst of the present invention.

The catalyst of the present invention can be used alone, in a single or a plurality of ebullating-bed reactors, in what is known as a one-step hydrocracking scheme, with or without liquid recycling of the non-converted fraction, optionally combined with a hydrorefining catalyst situated in a fixed-bed or ebullating-bed reactor upstream of the catalyst of the present invention.

The ebullating bed operates with removal of spent catalysts and daily addition of a new catalyst in order to preserve activity of the stable catalyst.

"One-Step" Process

What is known as one-step hydrocracking includes, in the first place and generally speaking, extensive, hydrorefining, the purpose of which is to carry out extensive hydrodeazotation and desulphurisation of the feedstock before said feedstock is sent on the hydrocracking catalyst proper, in particular if the hydrocracking catalyst comprises a zeolite. This extensive hydrorefining of the feedstock causes only limited conversion of the feedstock, into lighter fractions, which remains insufficient and therefore has to be supplemented on the more active hydrocracking catalyst. However, it should be noted that no separation occurs between the two types of catalysts. All of the effluent at the outlet of the reactor is injected on the hydrocracking catalyst proper and it is only subsequently that the products formed are separated. This version of hydrocracking, also called once-through hydrocracking, has a which displays recycling of the non-converted fraction toward the reactor with a view to more extensive conversion of the feedstock.

Fixed-Bed "One-Step" Process

For catalysts having a low silica content, the silica contents by weight of the substrate included in the composition of the catalyst are between 5 and 30% and preferably between 5 and 20%.

For catalysts having a high silica content, the silica contents by weight of the substrate included in the composition of the catalyst are between 20 and 80% and preferably between 30 and 60%.

If the catalyst according to the present invention is used upstream of a, for example Y zeolite-based, hydrocracking zeolite catalyst, use will advantageously be made of a catalyst having a low content by weight of silica as defined hereinbefore. It may also advantageously be used in combination with a hydrorefining catalyst, the hydrorefining catalyst being situated upstream of the catalyst of the present invention.

When the catalyst according to the present invention is used upstream of an alumina-silica-based or zeolite-based hydrocracking catalyst, in the same reactor in different catalytic beds or in different reactors, the conversion is generally (or preferably) less than 50% by weight and preferably less than 40% by weight.

The catalyst according to the invention can be used upstream or downstream of the zeolite catalyst. Downstream of the zeolite catalyst, it allows PAHs to be cracked. The term "PAH" refers to polyaromatic hydrocarbons as described, in particular, in the study "*Hydrocracking, Science and Technology*" by J. Scherzer, Editions M. Dekker Incorporated, 1996.

Ebullating-Bed "One-Step" Process

The catalyst according to the invention can be used alone in one or more reactor(s). Within a process of this type, use may advantageously be made of a plurality of reactor(s) in series, the ebullating-bed reactor(s) containing the catalyst according to the invention being preceded by one or more reactor(s) containing at least one fixed-bed or ebullating-bed hydrorefining catalyst.

When the catalyst according to the present invention is used downstream of a hydrorefining catalyst, the conversion of the fraction of the feedstock brought, about by this hydrorefining catalyst is generally (or preferably) less than 30% by weight and preferably less than 25%.

Fixed-Bed "One-Step" Process with Intermediate Separation

The catalyst according to the present invention can also be used in what is known as a one-step hydrocracking process comprising a hydrorefining zone, a zone allowing the partial elimination of ammonia, for example by a hot flash, and a zone comprising a hydrocracking catalyst. This process for hydrocracking hydrocarbonated feedstocks in one step for the production of middle distillates and optionally of oil bases comprises at least one first hydrorefining reaction zone and at least one second reaction zone in which the hydrocracking of at least a portion of the effluent from the first reaction zone is operated. This process also includes incomplete separation of the ammonia from the effluent leaving the first zone. This separation is advantageously carried out by means of an intermediate hot flash. The hydrocracking operated in the second reaction zone is carried out in the presence of a quantity of ammonia that is less than the quantity present in the feedstock, preferably less than 1,500 ppm by weight, more preferably less than 1,000 ppm by weight and even more preferably less than 800 ppm by weight of nitrogen. The catalyst of the present invention is used preferably in the hydrocracking reaction zone, combined or not combined with a hydrorefining catalyst situated upstream of the catalyst of the present invention.

The catalyst according to the invention can also be used in the first, converting pretreatment, reaction zone, alone or in combination with a conventional hydrorefining catalyst, situated upstream of the catalyst according to the invention, in one or more catalytic bed(s), in one or more reactor(s).

"One-Step" Hydrocracking Process with Preliminary Hydrorefining on a Low-Acidity Catalyst The catalyst according to the invention can be used in a hydrocracking process comprising:
- a first hydrorefining reaction zone in which the feedstock is contacted with at least one hydrorefining catalyst displaying in the standard activity test, defined in French patent No. 2 840 621, a cyclohexane conversion rate of less than 10% by mass,
- a second hydrocracking reaction zone in which at least a portion of the effluent obtained from the hydrorefining step is contacted with at least one hydrocracking catalyst displaying in the standard activity test a cyclohexane conversion rate of greater than 10% by mass, the catalyst according to the invention being present in at least one of the two reaction zones.

The proportion of the catalytic volume of the hydrorefining catalyst represents generally 20 to 45% of the total catalytic volume.

The effluent obtained from the first reaction zone is introduced at least in part, preferably in its entirety, into the second reaction zone of said process. Intermediate separation of the gases be carried out as described hereinbefore.

The effluent at the outlet of the second reaction zone is subjected to what is known as final separation (for example by atmospheric distillation optionally followed by distillation under vacuum), so as to separate the gases. At least one residual liquid fraction is obtained, containing basically products, the boiling point of which is generally higher than 340° C., which can be at least partially recycled upstream of the second reaction zone of the process according to the invention and preferably upstream of the alumina-silica-based hydrocracking catalyst, with a view to producing middle distillates. The conversion into products having boiling points of lower than 340° C., or else lower than 370° C., is at least 50% by weight.

"Two-Step" Process

In what is known as a two-step hydrocracking scheme with intermediate separation between the two, reaction zones, in a given step, the catalyst of the present invention can be used in one or both reactors, combined or not combined with a hydrorefining catalyst situated upstream of the catalyst of the present invention.

Two-step hydrocracking includes a first step, the purpose of which is, as in the "one-step" process, to hydrorefine the feedstock, but also to attain conversion thereof, in general of from about 40 to 60%. The effluent obtained from the first step subsequently undergoes separation (distillation) which is most often called intermediate separation and the purpose of which is to separate the conversion products of the non-converted fraction. In the second step of a two-step hydrocracking process, only the fraction of the feedstock that is not converted during the first step is treated. This separation allows a two-step hydrocracking process to be more selective in relation to middle distillates (kerosene+diesel) than a one-step process. Indeed, the intermediate separation of the conversion products prevents "overcracking" thereof with naphtha and gas in the second step on the hydrocracking catalyst. Moreover, it should be noted that the non-converted fraction of the feedstock treated in the second step contains in general very low contents of $NH_3$ and also of organic, nitrogen-containing compounds, in general less than 20 ppm by weight or even less per 10 ppm by weight.

The configurations of fixed-bed or ebullating-bed catalytic beds described in the case of what is known as a one-step process can be used in the first step of what is known as a two-step scheme, regardless of whether the catalyst according to the invention is used alone or in combination with a conventional hydrorefining catalyst.

For what are known as one-step processes and for the first step of the two-step hydrocracking processes, the preferred catalysts according to the invention are doped catalysts based on group VIII non-noble elements, even more preferably nickel and tungsten-based catalysts, the preferred doping element being phosphorus.

The catalysts used in the second step of the two-step hydrocracking processes are preferably doped catalysts based on group VIII noble elements, even more preferably platinum and/or palladium-based catalysts, the preferred doping element being phosphorus.

Hydrotreatment/Hydrorefining of Hydrocarbonated Feedstocks According to the Invention The catalysts according to the invention are used for the hydrotreatment and hydrorefining of hydrocarbon-containing feedstocks such as petroleum cuts, cuts obtained from coal or hydrocarbons produced from natural gas and more specifically for hydrogenation, hydrodesulphurisation, hydrodeazotation, hydrodeoxygenation, hydrodearomatisation and hydrodemetallation of hydrocarbonated feedstocks containing aromatic and/or olefinic and/or naphthenic and/or paraffinic compounds, said feedstocks containing optionally metals and/or nitrogen and/or oxygen and/or sulphur.

More specifically, the feedstocks employed in the hydrotreatment processes are petrols, gas oils, gas oils under vacuum, atmospheric residues, residues under vacuum, atmospheric distillates, distillates under vacuum, heavy fuels, oils, waxes and paraffins, used oils, deasphalted residues or crude substances, feedstocks originating from thermal or catalytic conversion processes and mixtures thereof. They contain in general heteroatoms such as sulphur, oxygen and nitrogen and/or at least one metal.

As stated hereinbefore, the catalysts of the invention can be used in a large number of hydrorefining or hydrotreatment applications. The operating conditions which can be applied in these processes are usually: a temperature, of from 200 to 450° C., preferably between 250 and 440° C., a pressure of from 1 to 25 MPa, preferably between 1 and 18 MPa, an hourly volume velocity of from 0.1 to 20 h$^{-1}$, preferably between 0.2 and 5 h$^{-1}$, a hydrogen/feedstock ratio, expressed in volume of hydrogen, measured under normal temperature and pressure conditions, per volume of liquid feedstock, generally of from 80 l/l to 5,000 l/l and most often of from 100 l/l to 2,000 l/l.

EXAMPLES

Example 1

Preparation of the IZM-2 Zeolite Used in the Catalyst According to the Invention The preparation of the IZM-2 zeolite used in the catalyst according to the invention passes first through the preparation of its structuring agent, 1,6-bis(methylpiperidinium)hexane dibromide. 50 g of 1,6-dibromohexane (0.20 mole, 99%, Alfa Aesar) are added to a 1-1 flask containing 50 g of N-methylpiperidine (0.51 mole, 99%, Alfa Aesar) and 200 ml of ethanol. The reaction medium is stirred and refluxed for 5 h. The mixture is subsequently cooled to ambient temperature, then filtered. The mixture is poured into 300 ml of cold diethyl ether, then the precipitate formed is filtered and washed with 100 ml of diethyl ether. The solid obtained is recrystallised in an ethanol/ether mixture. The solid obtained is dried under vacuum for 12 h. 71 g of a white solid (i.e. a yield of 80%) are obtained. The product possesses the expected 1H NMR spectrum. 1H NMR (D$_2$O, ppm/TMS): 1.27 (4H, m); 1.48 (4H, m); 1.61 (4H, m); 1.70 (8H, m); 2.85 (6H, s); 3.16 (12H, m).

An IZM-2 solid used in the catalyst according to the invention is subsequently prepared in the following manner: 20.269 g of a colloidal suspension of silica, known under the commercial term Ludox AS-40 sold by Aldrich, are incorporated into a solution composed of 0.32 g of sodium aluminate (Carlo Erba), 0.634 g of sodium hydroxide (Prolabo), 9.95 g of 1,6-bis(methylpiperidinium)hexane dibromide and 68.82 g of deionised water. The molar composition of the mixture is as follows: SiO$_2$; 0.0125 Al$_2$O$_3$; 0.08 Na$_2$O; 0.17 1,6-bis (methylpiperidinium)hexane dibromide; 33.33 H$_2$O. The mixture is stirred vigorously for half an hour. The mixture is then transferred, after homogenisation, to an autoclave. The autoclave is heated over 9 days to 170° C. while stirring (250 rpm). The crystallised product obtained is filtered, washed in deionised water (in order to attain a neutral pH), then dried overnight at 100° C. The solid is then introduced into a muffle furnace where the calcining is carried out the calcining cycle includes a rise in temperature up to 200° C., a stage at 200° C. maintained for 2 hours, a rise in temperature up to 550° C., followed by a stage at 550° C. maintained for 8 hours, then a return to ambient temperature. The calcined solid product was analysed by X-ray diffraction and identified as consisting of IZM-2 solid.

Example 2

Preparation of a Substrate Containing an H-IZM-2 Zeolite Used in the Catalyst According to the Invention A catalyst substrate according to the invention containing an IZM-2 zeolite was produced in a large quantity in such a way as to be able to prepare various catalysts based on the same substrate. The IZM-2 zeolite, which is prepared as in Example 1, possesses a total Si/Al atomic ratio equal to 29.8 and a Na/Al atomic ratio equal to 0.25.

This IZM-2 zeolite is subjected to four ion exchanges in a 10 N NH$_4$NO$_3$ solution, at about 100° C. over 4 hours for each exchange. The solid thus obtained is denoted by NH$_4$-AZM-2 and possesses a Si/Al ratio=29.8 and a Na/Al ratio=0.013.

A catalyst substrate according to the invention containing an IZM-2 zeolite is produced in the following manner: 19.5 g of the NH$_4$-IZM-2 zeolite are mixed with 80.5 g of a matrix composed of ultrafine tabular boehmite or alumina gel sold under the name SB3 by the company Condéa Chemie GmbH. This powder mixture was then mixed with an aqueous solution containing 66% by weight of nitric acid (7% by weight of acid per gram of dry gel), then kneaded for 15 minutes. The kneaded paste is then extruded through a die having a diameter of 1.2 mm. The extrudates are then calcined at 500° C. for 2 hours under air. After calcining at 500° C., the zeolite is now in H-IZM-2 protonic form and the Al-IZM-2 substrates are terminated.

Example 3

Preparation of Catalysts According to the Invention Containing an IZM-2 Zeolite

The substrate extrudates prepared in Example 2 are dry impregnated by a solution of a mixture of ammonium heptamolybdate and nickel nitrate, and finally calcined under air at 550° C. in situ in the reactor. The oxide contents by weight of the NiMo—Al-IZM-2 catalyst which were obtained are set out in Table 1.

The substrate extrudates from Example 2 are dry impregnated by a solution of a mixture of ammonium heptamolybdate, nickel nitrate and orthophosphoric acid, and finally calcined under air at 550° C. in situ in the reactor. The oxide contents by weight of the NiMoP—Al-IZM-2 catalyst are set out in Table 1.

Fluorine is then added to this catalyst by impregnation of a diluted fluorohydric acid solution in such a way as to deposit about 1% by weight of fluorine. After drying overnight at 120° C. and calcining at 550° C. for 2 hours under dry air, the NiMoPF—Al-IZM-2 catalyst is obtained. The oxide contents by weight of the NiMoPF-IZM-2 catalyst which were obtained are set out in Table 1.

TABLE 1

Features of the Al-IZM-2 catalysts according to the invention

| Catalyst | NiMo—Al-IZM-2 | NiMoP—Al-IZM-2 | NiMoPF—Al-IZM-2 |
|---|---|---|---|
| MoO$_3$ (% by, weight) | 14.1 | 13.4 | 13.3 |
| NiO (% by weight) | 3.2 | 3.1 | 3.0 |
| P$_2$O$_5$ (% by weight) | — | 4.1 | 4.1 |
| Total SiO$_2$ (% by weight) | 14.7 | 14.1 | 14.1 |
| F (% by weight) | — | — | 1.0 |
| 100% supplement composed for the most part of Al$_2$O$_3$ (% by weight) | 68.0 | 65.3 | 64.5 |

Example 4

Preparation of a Substrate Containing an IZM-2 Zeolite and a Silica-Alumina

We manufactured by coprecipitation a silica-alumina powder having a composition of 2% by weight of SiO$_2$ and 98% by weight of Al$_2$O$_3$. A hydrocracking catalyst substrate containing this silica-alumina and the NH$_4$-IZM-2 zeolite from Example 1 was then manufactured. For that purpose, use is made of 19.7% by weight of the NH$_4$-IZM-2 zeolite from Example 1, which is mixed with 80.3% by weight of a matrix composed of the silica-alumina prepared hereinbefore. This powder mixture was then mixed with an aqueous solution containing 66% nitric acid (7% by weight of acid per gram of dry gel), then kneaded for 15 minutes. At the end of this kneading, the paste obtained is passed through a die having cylindrical orifices having a diameter equal to 1.4 mm. The extrudates are subsequently dried overnight at 120° C., then calcined at 550° C. for 2 hours under air.

Example 5

Preparation of Catalysts According to the Invention Containing an IZM-2 Zeolite and a Silica-Alumina The substrate extrudates containing a silica-alumina and an IZM-2 zeolite from Example 3 are dry impregnated by an aqueous solution of a mixture of ammonium heptamolybdate, nickel nitrate and orthophosphoric acid, dried overnight at 120° C. under air and finally calcined under air at 550° C. The oxide contents by weight of the NiMoP—SiAl-IZM-2 catalyst which were obtained are set out in Table 2.

Fluorine is subsequently added to this catalyst by impregnation of a diluted fluorohydric acid solution in such a way as to deposit about 1% by weight of fluorine. After drying overnight at 120° C. and calcining at 550° C. for 2 hours under dry air, the NiMoPF—SiAl-IZM-2 catalyst is obtained. The oxide contents by weight of the NiMoPF—SiAl-IZM-2 catalyst which were obtained are set out in Table 2.

TABLE 2

Features of the SiAl-IZM-2 catalysts according to the invention

| Catalyst | NiMoP—SiAl-IZM-2 | NiMoPF—SiAl-IZM-2 |
|---|---|---|
| $MoO_3$ (% by weight) | 13.4 | 13.3 |
| NiO (% by weight) | 2.9 | 3.0 |
| $P_2O_5$ (% by weight) | 4.2 | 4.1 |
| F (% by weight) | — | 0.9 |
| $SiO_2$ (% by weight) | 15.6 | 15.4 |
| 100% supplement composed for the most part of $Al_2O_3$ (% by weight) | 63.9 | 63.3 |

Example 6

Comparison of the Hydrocracking Catalysts of a Distillate Under Vacuum

The catalysts, the preparations of which are described in the preceding examples, are used under high-conversion (60-100%) hydrocracking conditions. The petroleum feedstock is a hydrotreated distillate under vacuum, the main features of which are set out in Table 3.

TABLE 3

Properties of the feedstock used

| Density (20/4) | 0.869 |
|---|---|
| Sulphur (ppm by weight) | 502 |
| Nitrogen (ppm by weight) | 10 |
| Simulated distillation | |
| Initial point | 298° C. |
| 10% point | 369° C. |
| 50% point | 427° C. |
| 90% point | 481° C. |
| Final point | 538° C. |

This feedstock was obtained by hydrotreatment of a distillate under vacuum on an HRK558 catalyst sold by the company Axens comprising a group VIB element and a group VIII element which are deposited on alumina.

0.6% by weight of aniline and 2% by weight of dimethyl disulphide are added to the feedstock in order to simulate the partial pressures of $H_2S$ and $NH_3$ present in the second hydrocracking step. The feedstock thus prepared is injected into the hydrocracking test unit which comprises a fixed-bed reactor, with rising movement of the feedstock (up-flow), into which 80 ml of catalyst are introduced. The catalyst is sulphided by a mixture of n-hexane/DMDS+aniline up to 320° C. It should be noted that any in-in situ or ex-situ sulphiding method is suitable. Once the sulphiding has been carried out, the feedstock described in Table 3 can be transformed. The operating conditions of the test unit are set out in Table 4.

TABLE 4

Test conditions of the catalysts

| Total pressure | 9 Mpa |
|---|---|
| Catalyst | 80 $cm^3$ |
| Temperature | 360-420° C. |
| Hydrogen flow rate | 80 l/h |
| Feedstock flow rate | 80 $cm^3$/h |

The catalytic performance levels are expressed by the temperature, which allows a crude conversion level of 70% to be reached, and by the petrol and jet fuel (kerosene) yields. These catalytic performance levels are measured on the catalyst once a stabilisation period, generally at least 48 hours, has been observed.

The crude conversion CC is assumed to be equal to:

CC=% by weight of "380° C. minus" of the effluent wherein "380° C. minus" represents the fraction, distilled at a temperature of less than or equal to 380° C.

The petrol yield (27-150) (referred to hereinafter as Pet Yld) is equal to the % by weight of compounds having a boiling point of between 27 and 150° C. in the effluents. The jet fuel yield (kerosene, 150-250, referred to hereinafter as Kero Yld) is equal to the % by weight of compounds having a boiling point of between 150 and 250° C. in the effluents. The gas oil yield (250-380) is equal to the % by weight of compounds having a boiling point of between 250 and 380° C. in the effluents.

The reaction temperature is fixed in such a way as to attain a crude conversion CC equal to 70% by weight. The following Table 7 lists the reaction temperature and the light and middle distillate yields for the catalysts described in the foregoing examples.

TABLE 5

Catalytic activities of the hydrocracking catalysts

| | T (° C.) | Pet Yld (% by weight) | Kerosene Yld (% by weight) | Gas Oil Yield (% by weight) |
|---|---|---|---|---|
| NiMo—Al-IZM-2 | 375 | 30.7 | 20.2 | 16.2 |
| NiMoP—Al-IZM-2 | 374 | 30.1 | 21.4 | 17.5 |
| NiMoPF—Al-IZM-2 | 373 | 30.8 | 20.7 | 16.1 |
| NiMoP—SiAl-IZM-2 | 372 | 32.3 | 18.3 | 15.5 |
| NiMoPF—SiAl-IZM-2 | 373 | 31.9 | 17.6 | 14.2 |

Table 5 demonstrates that the catalysts which contain IZM-2 zeolite and are prepared using the process of the invention and used in a process according to the invention are active and all lead to temperatures allowing a conversion level of 70% by weight for conversion into 380° C. minus to be obtained at high distillate yields and the like.

The invention claimed is:

1. A catalyst comprising:
a substrate comprising at least one crystallized IZM-2 solid displaying an X-ray diffraction pattern including at least the rays listed in the table hereinafter:

| 2 theta (°) | dhkl (Å) | Irel |
|---|---|---|
| 5.07 | 17.43 | ww |
| 7.36 | 12.01 | ss |
| 7.67 | 11.52 | ss |
| 8.78 | 10.07 | s |
| 10.02 | 8.82 | ww |
| 12.13 | 7.29 | ww |
| 14.76 | 6.00 | ww |
| 15.31 | 5.78 | ww |
| 15.62 | 5.67 | ww |
| 16.03 | 5.52 | ww |
| 17.60 | 5.03 | ww |
| 18.22 | 4.87 | ww |
| 19.01 | 4.66 | ww |
| 19.52 | 4.54 | ww |
| 21.29 | 4.17 | m |
| 22.44 | 3.96 | w |
| 23.10 | 3.85 | mw |
| 23.57 | 3.77 | w |
| 24.65 | 3.61 | ww |
| 26.78 | 3.33 | w |
| 29.33 | 3.04 | ww |
| 33.06 | 2.71 | ww |
| 36.82 | 2.44 | ww |
| 44.54 | 2.03 | ww | where ss=very strong; s=strong; m=moderate; mw=moderately weak; w=weak; ww=very weak, said substrate having a chemical composition, expressed on an anhydrous base, in terms of oxide moles, by the following general formula: $XO_2: aY_2O_3: bM_{2/n}O$, wherein X represents at least one tetravalent element, Y represents at least one trivalent element and M is at least one alkali metal and/or an alkaline earth metal of valency n, a and b representing respectively the number of moles of $Y_2O_3$ and $M_{2/n}O$ and a is between 0 and 0.5 and b is between 0 and 1, and an active phase containing at least one hydro-dehydrogenating element from group VIB and/or at least one hydro-dehydrogenating element from non-noble group VIII of the periodic table, said catalyst being a sulfide phase catalyst.

2. The catalyst according to claim 1, wherein X is silicon.

3. The catalyst according to claim 1, wherein Y is aluminium.

4. The catalyst according to claim 1, wherein the content by mass of group VIB element is between 0.1 and 40% by weight relative to the total mass of the catalyst.

5. The catalyst according to claim 1, wherein the content by mass of non-noble group VIII element is between 0 and 25% by weight relative to the total mass of the catalyst.

6. The catalyst according to claim 1, wherein the group VIB elements are tungsten, molybdenum, or a mixture thereof.

7. The catalyst according to claim 1, wherein the group VIII non-noble elements are cobalt, nickel, or a mixture thereof.

8. The catalyst according to claim 1, wherein said catalyst further comprises an amorphous or poorly crystallized porous inorganic oxide binder.

9. A process for hydrocracking and/or hydroconversion of hydrocarbon feedstocks, comprising subjecting said feedstocks to a catalyst according to claim 1 so as to effect hydrocracking and/or hydroconversion, with the proviso that the feedstock is not obtained from a Fisher-Tropsch process.

10. The hydrocracking and/or hydroconversion process according to claim 9, carried out as a one-step process.

11. The hydrocracking and/or hydroconversion process according to claim 9, carried out as a two-step process.

12. The process according to claim 9, operating in the presence of hydrogen, at a temperature higher than 200° C., under a pressure higher than 1 MPa, a space velocity between 0.1 and 20 $h^{-1}$, and a liter of hydrogen/liter of hydrocarbon ratio by volume between 80 and 5,000 l/l.

13. The process according to claim 9, wherein the hydrocarbon feedstocks are LCOs (light cycle oils: light gas oils obtained from a catalytic cracking unit), atmospheric distillates, distillates under vacuum, feedstocks originating from aromatic extraction units of lubricating oil bases or obtained by solvent dewaxing of lubricating oil bases, distillates originating from processes for desulfurization or hydroconversion in a fixed bed or in a bed ebullating with ARs (atmospheric residues) and/or RUVs (residues under vacuum) and/or deasphalted oils, deasphalted oils, alone or in a mixture.

14. A process for hydrotreatment of hydrocarbon feedstocks, comprising subjecting said feedstocks to the catalyst according to claim 1 so as to effect hydrotreatment, with the proviso that the feedstock is not obtained from a Fisher-Tropsch process.

* * * * *